(12) United States Patent
Davila

(10) Patent No.: US 11,485,438 B2
(45) Date of Patent: Nov. 1, 2022

(54) VISIBLE SAFELY BICYCLE

(71) Applicant: Julia Graciela Davila, Jackson Heights, NY (US)

(72) Inventor: Julia Graciela Davila, Jackson Heights, NY (US)

(*) Notice: Subject to any disclaimer, the term of this patent is extended or adjusted under 35 U.S.C. 154(b) by 0 days.

(21) Appl. No.: 16/215,505

(22) Filed: Dec. 10, 2018

(65) Prior Publication Data
US 2020/0180720 A1 Jun. 11, 2020

(51) Int. Cl.
*A41D 13/01* (2006.01)
*A41D 19/015* (2006.01)
*B62J 6/20* (2006.01)

(52) U.S. Cl.
CPC ............. *B62J 6/20* (2013.01); *A41D 13/01* (2013.01); *A41D 19/0157* (2013.01)

(58) Field of Classification Search
CPC ............................ A41D 13/01; A41D 19/0157
See application file for complete search history.

(56) References Cited

U.S. PATENT DOCUMENTS

| | | | | |
|---|---|---|---|---|
| 5,823,653 | A * | 10/1998 | Elam, Jr | B62J 6/01 |
| | | | | 362/473 |
| 6,375,864 | B1 * | 4/2002 | Phillips | C08K 3/02 |
| | | | | 252/301.33 |
| 2001/0004808 | A1 * | 6/2001 | Hurwitz | A43B 3/001 |
| | | | | 36/137 |
| 2010/0291409 | A1 * | 11/2010 | Dicks | C09D 11/50 |
| | | | | 428/690 |

FOREIGN PATENT DOCUMENTS

| | | | | |
|---|---|---|---|---|
| DE | 202010017395 U1 * | 1/2012 | ............ | A41D 13/01 |
| FR | 2428563 A1 * | 1/1980 | ............ | B62K 21/12 |
| WO | WO-9967568 A1 * | 12/1999 | ............ | A41D 13/01 |

* cited by examiner

*Primary Examiner* — Charlie Y Peng
(74) *Attorney, Agent, or Firm* — The Iwashko Law Firm, PLLC; Lev Ivan Gabriel Iwashko

(57) ABSTRACT

The visible safety bicycle is a system of several photoluminescent plastic spirals to be visible day and night alternately, which will surround each part of the bicycle; bicycle frame parts, bicycle handlebar, bicycle seat post, bicycle fork, bicycle wheel hub, and also bicycle wheel's spokes, with high visibility of the area where they are installed, achieving security for the user.

19 Claims, 4 Drawing Sheets

Detail A

Detail C

Detail B

VISIBLE SAFELY BICYCLE

FIELD OF THE INVENTION

Figure 2:
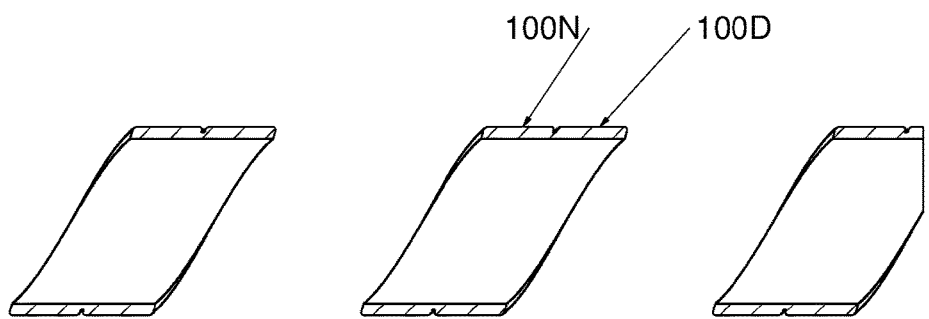

The present invention visible safety bicycle refers to a system of several photo-luminescent plastic spirals to be visible day and night alternately, which will surround of the bicycle frame and wheel's spokes.

BRIEF SUMMARY OF THE INVENTION

The visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes, with high visibility of the area where they are installed, achieving security for the user.

BACKGROUND OF THE DISCLOSURE

There are inventions based on the visibility of bicycles through lamps, reflectors, lights, which were made for the same purpose, without really providing the visibility required by the driver of a vehicle, to avoid an accident with a bicycle; since in the night the lights hide the figure of the vehicle that is behind them, (in this case the bicycle and its drivers make invisible) the drivers who go in the opposite direction.

In the same way it happens in the day, because there is no image, color or figure that stands out among the smaller vehicles and even more, on bicycles, creating confusion in visibility. Generating the need during the day and night for a dear presence of visibility of the bicycle in a transit way.

For this reason it is imperative to implement visible safety bicycle of safety which surrounds the frame structures of the bicycle and also surrounds the spokes of the bicycle in its length, bringing with it high visibility, from front to back, vice versa, the sides of the bicycle, day and night alternately, making the bicycle visible 24 hours, thus reducing the mortality of users.

U.S. Pat. No. 9,784,415 Linge (Linge) relates a safety cover comprising: a split tubular member of resiliently flexible material having a longitudinal axis that defines a lengthwise dimension measured between opposing ends of said split tubular member and a circumferential span in cross-sectional planes lying normal to said longitudinal axis that continuously spans a substantial majority of a circumference around said longitudinal axis, said split tubular member being split longitudinally over an entirety of the lengthwise dimension from one of said opposing ends of the split tubular material to the other; wherein the split tubular member comprises a uniform material composition fully throughout an entirety of the split tubular member, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 7,771,070 to Tarlton ("Tarlton") relates an illumination source, comprising: a resilient sheath; and a photo luminescent core housed within the sheath, the core comprising: a gel medium; and a photo luminescent phosphor powder suspended within the gel medium, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 9,610,994 to Paterson ("Paterson") relates to a system for illuminating a bicycle having a frame comprising a plurality of tubular frame members wherein each frame has a plurality of orifices. The orifices allow light rays to pass from inside each tubular frame member to outside each tubular frame member, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 9,347,625 to Bushee ("Bushee") relates to the performance of chemical glow lights is enhancing by the provision of a battery-powered light-emitting diode (LED). The LED can be provided inside a pouch containing chemical which, when mixed together, produce a glowing light for a short period of time, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 9,027,514 to Kantor ("Kantor") relates to an article of manufacture for stretchable night visibility bands for people and animals with an inner band consisting of a primarily stretchable, an outer band consisting of a night visibility material. A preferred embodiment includes further an outer band made of a night visibility material fabricated of least one of the following: a reflective, fluorescent or a glow in the dark material and backed with a material such as Velcro that attaches to the inner band, these bands can be utilize also attached to non-human circumferences such as the bars of a bicycle, purse handles and baby carriages, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 8,905,611 to Connor ("Connor") relates to this invention comprises a flexible-resilient system of lighting that spans a bilateral safety zone around the bicycle in the upper rear quadrant of space around the bicycle that can be clear seen by the driver of a vehicle approaching the bicycle from the rear, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 8,613,519 to Dondo ("Dondo") relates to disclosed herein is a retroreflector configured for mounting onto the spokes of a spoke wheel, comprising a body including fixing portions and a reflective surface extending over a major portion of the surface of the body, the body having an elongating shape and being configured so that it is mounted onto a spoke in the in the direction of its length. Their reflection is being directed principally towards the front and the rear of the vehicle, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 8,534,885 to Moore ("Moore") relates to an inexpensive, lightweight, water resistant and aerodynamic lighting device securely mounts to the spokes of a bicycle wheel for improved safety and visibility of the bicycle and rider at night, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 8,132,945 to Lunde ("Lunde") relates to the present invention is an apparatus and method for illuminating a bicycle crank or pedal using an electronic light source, magnets, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel huh, and also bicycle wheel's spokes.

U.S. Pat. No. 8,124,876 to Dayton ("Dayton") relates to spiral wound materials, spirals, and shafts made therefrom that have wraps with edges that may nest within one another are describe. Such edges allow spiral to achieve a smaller bending radius, meaning tighter turns and more flexibility due to the ability of adjacent wraps to nest within each other when the shaft is bent. Spirals having wraps with edges capable of nesting can be used in the medical field for devices that track anatomy, such as endoscopes, colonoscopies, catheters, and the like, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 7,950,835 to Carillo ("Carillo") relates to a bicycle or moped lighting system projects light onto a rider's moving legs to make the rider more visible to motor vehicles operators and thereby improve the rider's safety. A single light fixture is mounted below the bicycle seat and directs diverging lights beams toward the backs of both of the rider's legs. While peddling, the motion of the lighted legs attracts the attention of the moto vehicle operators thereby improving rider's visibility, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 7,579,550 to Dayton ("Dayton") relates to (same as U.S. Pat. No. 8,124,876) (same above) Spiral wound materials, spirals, and shafts made therefrom that have wraps with edges that may nest within one another are describe. Such edges allow spiral to achieve a smaller bending radius, meaning tighter turns and more flexibility due to the ability of adjacent wraps to nest within each other when the shaft is bent. Spirals having wraps with edges capable of nesting can be used in the medical field for devices that track anatomy, such as endoscopes, colonoscopies, catheters, and the like, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 7,252,127 to Goetz ("Goetz") relates to bicycle wheels have integral reflective areas to increase visibility of the bicycle. More specifically, the present invention is related to bicycle tires having reflecting areas showing through areas of the tire tread, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 7,032,338 to Sloot ("Sloot") relates to an accessory for wheels includes a body, two appendages extending from the body, each of the two appendages having a securing mechanism and an aperture, and each of the two appendages being wrap around a diameter of a spoke and the securing mechanism being place in the aperture, thereby securing each of the two appendages about the spoke, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 7,001,051 to Palmer ("Palmer") relates to a Plurality of lightning structures is provided for enhancing the visibility of a human powered vehicle at night. The visibility enhance human powered vehicle, has a frame with attached wheels having tires including sidewalls. The safety lightning structures include at least one photo luminescent section and at least one reflective section being located on at least one of the wheels. A light source is attachable to the human powered vehicle to direct light against the photo-luminescent sections, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 6,652,106 to Sloot ("Sloot") relates to the invention relates to a reflector, including at least one flexible reflective element wrapped around a bicycle member, a backing in contact wiry and first end of the at least one flexible reflective element along a portion of a periphery of the backing, thereby defining a pocket, and a second end of the at least one flexible reflective element place in between the backing and the at least one flexible reflective element by cooperation of the second end being held in place by the pocket, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 6,072,386 to Yu ("Yu") relates to bicycle spoke warning light device capable of setting and displaying characters, mounted on the spoke of the bicycle, in which a rotational speed detecting unit of a light emitting device detects the rotational speed of the spoke to a certain value emit light to form a picture or character and warning effect, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,803,574 to Szaniszlo ("Szaniszlo") relates to a safety light comprises a multi-faceted trans missive reflector housing a flushing light and a control unit power by battery. The control unit turns on the flushing light when motion and reduce ambient light conditions such as dusk to darkness are detected. The safety light may be affixed on a spoke of a bicycle wheel, close to the perimeter, and provides a highly visible streak of light from all viewing angles when the wheel is in motion, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,652,677 to Burison ("Burison") relates to the present invention pertains generally to a spoke mounted reflective apparatus for bicycles reflective wings on the apparatus allow maximization of the front and rear reflective surface areas within the clearance provided by a bicycle frame, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,624,175 to Gelormino ("Gelormino") relate to the present invention pertains to a bicycle safety light more particularly, the present invention pertains to a bicycle safety light that is mounted on the spokes of a bicycle tire, and produces a flashing light to increase visibility of the bicycle when riding at night, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,448,402 to Lorenzana ("Lorenzana") relates to a bicycle light reflector which mounts on the rear axle of a bicycle and includes an upwardly extending flexible mast supporting a disc reflector at its upper end for oscillatory movement, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,379,197 to Conyers ("Conyers") relate to A bicycle safety device for use with a bicycle comprising elates to bicycle light reflector which mounts on the rear axle of a bicycle and includes an upwardly extending flexible mast supporting a disc reflector at its upper end for oscillatory movement handlebars, which define outermost sides of the bicycle, and a frame, the lightning the device comprising: an elongated lens connected to a power source housing, a light bulb, light bulb retaining member, power source, and light switch, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 9,366,404 to Porter ('Porter') relate to decorative lighting system for sporting equipment includes at least one strip of electrical lights, such as LED lamps, which are connected to an electrical power source via wiring, and which are attached to an article of sporting equipment such as a snowboard, snow skis, snowshoes, a skateboard, a bicycle, or the like. The decorative lighting system may be substantially waterproof, and may provide both an attractive appearance when the sporting equipment is used in low-light conditions, while making the sporting equipment more visible in darkness, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,364,677 to Sendziak ("Sendziak") relates to a self-adhesive wrap-on handle grip for elongated handles such as those used in various types of implements such as sports racquets, baseball bats, handle bars, and the like includes an elongated preferably resilient material strip having a leading edge and a trailing edge and defining an undersurface and an outer surface, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,353,153 to Craig ("Craig") relates to an improved bicycle reflector being comprised of a rectangular plate means having a means for attaching said improved bicycle reflector to modern bicycle wheels equipped with spokes of a bicycle wheel, and a reflector means to impart a flushing light to an approaching automobile driver at night, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,278,732 to Frankum ("Frankum") relates to A light and reflector for use in combination with a bicycle wheel and other small vehicles and makes use of the centrifugal force generated from the rotation of the bicycle wheel for switching the light on during use, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 5,105,308 to Holley ("Holley") relates to an apparatus in association with a bicycle tire and the like which may be retractably secured to the tire, where upon an elongated strip formed cut-outs permit securement of the elongated strip to an exterior side wall of the tire. Triangular reflective segments may be adhesively and retractably mounted into the cut outs in securement of the organization to the associated tire, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 4,791,966 to Eilentropp ("Eilentropp") relates to A ribbon, preferable made of polytetrafluoroethylene and preferable in an interested configuration used for wrapping elongated stock such electrical conductors, tubes, or a removable mandrel, the wrapping to be made with overlapping edges follow by fusion to obtain a coherent configuration, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 4,575,789 to Tsuyama ("Tsuyama") relates to Reflex reflector having a reflector body and attaching means provided on the right and left sides of said reflector body and adapted to be attached between spokes of a spoke wheel, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 4,575,189 to Johnson ("Johnson") relates to bicycle reflector safety device with resiliently mounted reflectors which extend outwardly on both sides of the bicycle and provide warning to both and the rear, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 4,571,025 to Stephen ("Stephen") relates to reflective system for bicycles includes a pair of bent triangle shape reflectors which are mounted in oppositely facing fore and aft directions on a bicycle so as to present at least one large bright triangular shape reflective surface to any position around the bicycle. The front and rear reflectors are preferably of different colors so as to provide a ready indication of both the presence and direction of travel of a bicycle, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 4,467,404 to Gordon ("Gordon") relates to generally to the field of display devises adapted for attachment to a spoked wheel. More particularly, the invention relates to reflecting assemblies adapted for attachment to an individual spoke, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Bicycles reflectors. U.S. Pat. No. 4,429,950 to Zwahlen ("Zwahlen") relates to, and more particularly to a bicycle pedal reflector which provides a maximum reflective surface area without affecting the minimum tilt angle between the bicycle frame and the ground surface, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 4,417,783 to Le Vantine ("Le Vantine") relates to a novel signaling device for mounting on the rear of a bicycle that reflects and redirects light from a remote source back toward that source in the form of a pulsating or oscillating signal, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 4,093,263 to Rihm ("Rihm") relates to a bicycle safety reflector extends below the seat, cover the back of the seat and seat springs, and is secure to the seat cover and seat post thereby providing a large reflecting area making the bicycle clearly visible to operators of faster moving vehicles, used at night, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

U.S. Pat. No. 3,951,516 to Rihm ("Rihm") relates to two tone bicycle reflector having two contrasting reflective surfaces and bracket for selectively supporting the reflector in selected positions on a bicycle, differ to the visible safety bicycle is a system of several photo-luminescent plastic spirals to be visible day and night alternately, which will surround each part of the bicycle; bicycle frame parts, bicycle handlebar, bicycle seat post, bicycle fork, bicycle wheel hub, and also bicycle wheel's spokes.

DETAILED DESCRIPTION OF THE PREFERRED EMBODIMENT

Figure 1:
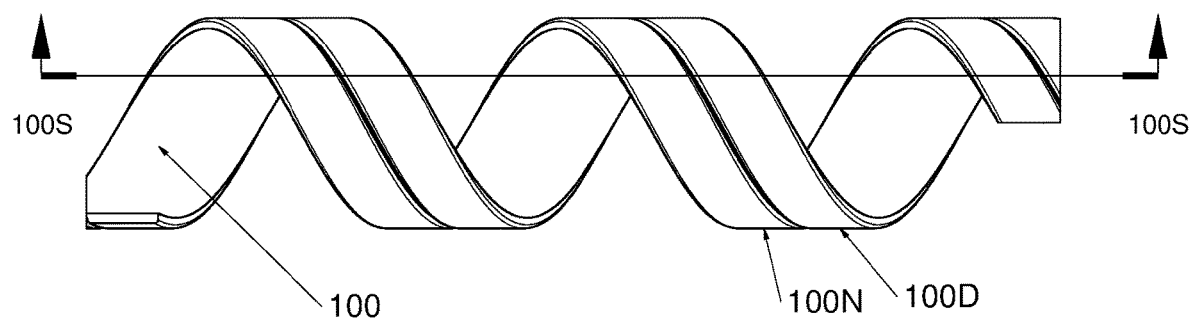
Figure 8:
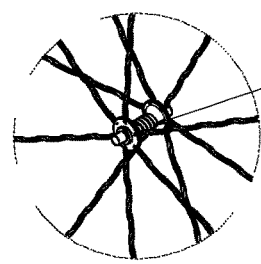

First, we refer to FIG. 1. Where is a segment of the Visible Safety Bicycle. 100; showing on its external side and divided, the day visible section, 100D; and the visible section at night. 100N; (described in FIGS. 1 and 2). In the same way we have the sectional section that goes from 100S; at 100S; which is shown in FIG. 2. In detail where the visible sectional pan of day 100D is shown; and the sectional part visible at night 100N. Continuing with FIG. 3. Where is shown a bicycle without wheels and without the crankset system, where the Visible Safety Bicycle, 100; which is installed in each of the constituent parts of the bicycle taking the name of the area where it will be installed, in this way we have, the visible safety bicycle top tube 101; the visible safety bicycle head tube 102; the visible safety bicycle down tube 103; the visible safety bicycle sit tube down 104; the visible safety bicycle sit tube top 105; the visible safety bicycle sit stay right 106; the visible safety bicycle sit stay left 107; the visible safety bicycle chain stay right 108; the visible safety bicycle chain stay left 109; the visible safety bicycle fork right 110; the visible safety bicycle fork left 111; the visible safety bicycle stem 112; the visible safety bicycle handlebar right 113; the visible safety bicycle handlebar left 114; the visible safety bicycle sit post 115. Continuing with FIG. 4. this is a rear bicycle wheel 300; showing detail A; and detail C; where the detail A; shown in FIG. 5, the visible safety bicycle wheel rear hub 117; is being shown; likewise the detail C; shown in FIG. 6, shows the visible safety bicycle wheel spoke 116; in FIG. 7, the front bicycle wheel 200 is shown; with detail B; where the detail B; shown in FIG. 8, shows the visible safety bicycle wheel front hub 118; finally in FIG. 9, This is a full view of the visible safety bicycle in a bicycle without crankset and chain.

BRIEF DESCRIPTION OF THE PREFERRED EMBODIMENT

FIG. 1; This is a visible safety bicycle.

FIG. 2; This is a cross-cut sectional showing visible safety bicycle day and night sections.

Figure 3:
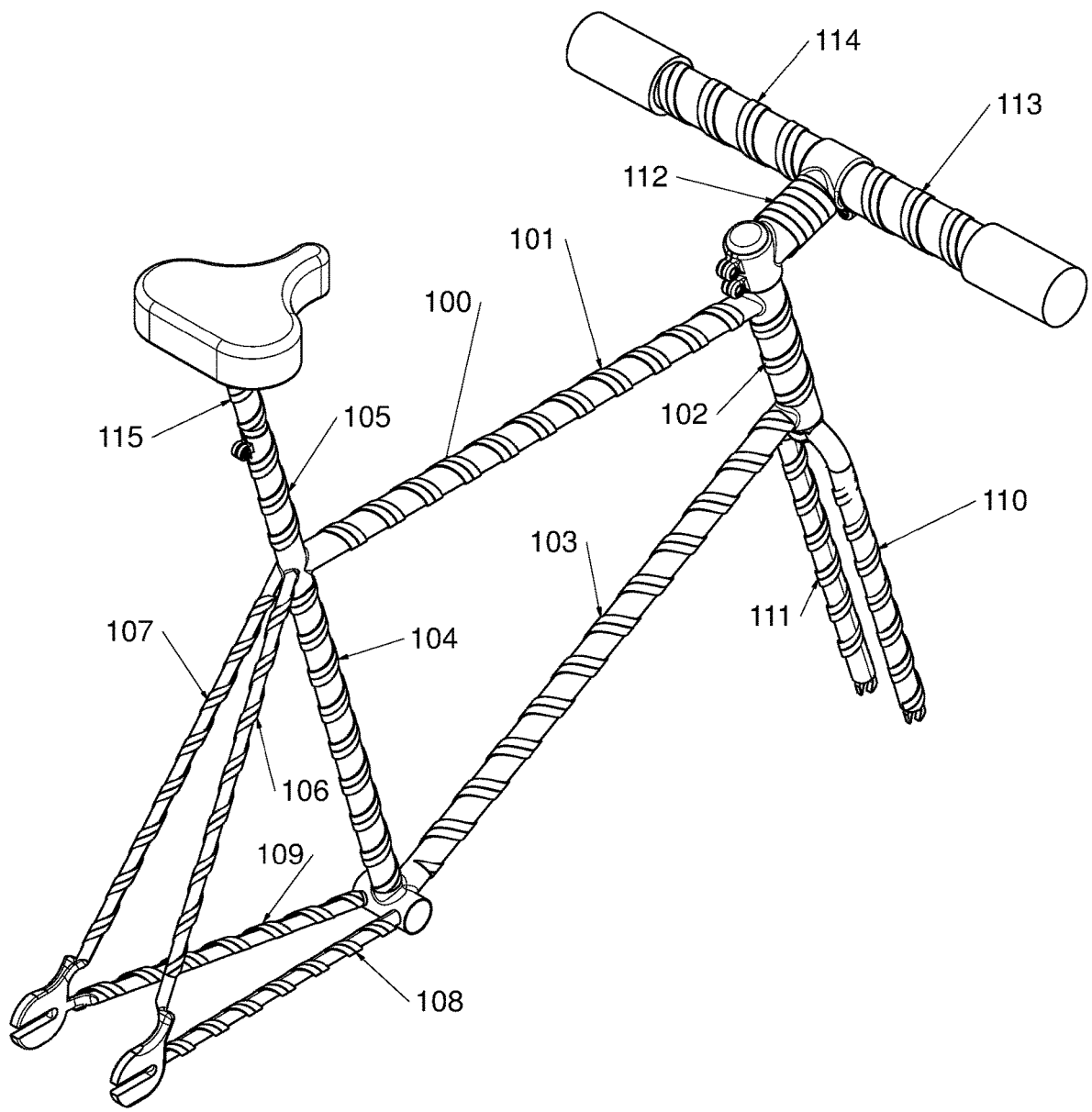

FIG. 3; This is a global view of the visible safety bicycle in each of its positions in the frame of the bicycle, also on the fork, stem, handlebar and seat post.

Figure 4:
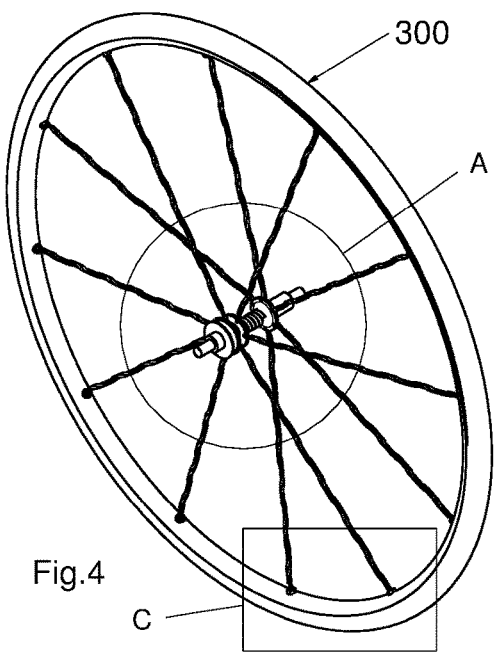

FIG. 4; This is a rear bicycle wheel showing detail A and detail C.

Figure 5:
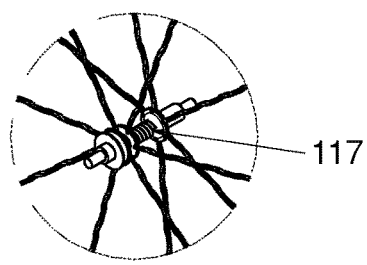
Figure 6:
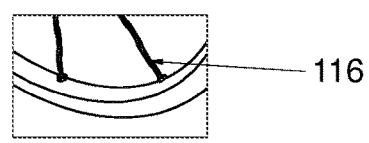

FIG. 5; This is a detail A of the rear bicycle wheel showing the visible safety bicycle wheel rear hub.

FIG. 6; This is a detail C of the bicycle wheel showing a visible safety bicycle wheel spoke.

Figure 7:
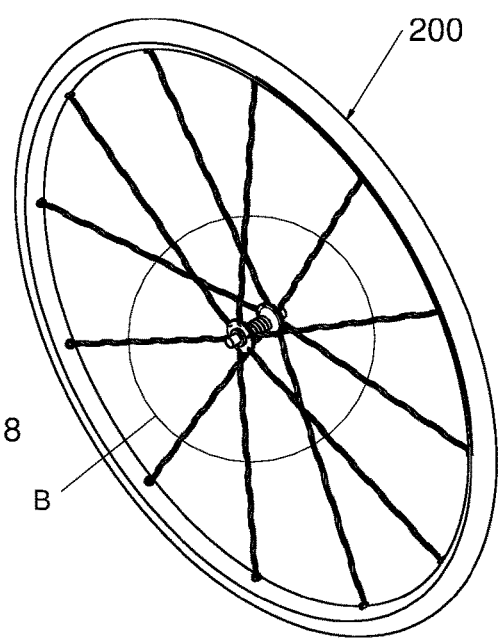

FIG. 7; This is a front bicycle wheel showing detail B.

FIG. 8; This is a detail B of the front bicycle wheel showing the visible safety bicycle wheel front hub.

Figure 9:

FIG. 9; This is a full global visible safety bicycle in a bicycle without crankset and chain.

BRIEF LIST OF REFERENCE NUMERALS UTILIZED IN THE DRAWING

100; Visible safety bicycle. 100.
100N; Visible safety bicycle night. 100N.
100D; Visible safety bicycle Day. 100D.
100S; Visible safety bicycle cross section. 100S.
101; Visible safety bicycle top tube. 101.
102; Visible safety bicycle head tube. 102.
103; Visible safety bicycle down tube. 103.
104; Visible safety bicycle seat tube down. 104.
105; Visible safety bicycle seat tube top 105.
106; Visible safety bicycle seat stay right. 106.
107; Visible safety bicycle seat stay left. 107.
108; Visible safety bicycle chain stay right. 108.
109; Visible safety bicycle chain stay left. 109.
110; Visible safety bicycle fork right. 110.
111; Visible safety bicycle fork left. 111.
112; Visible safety bicycle stem. 112.
113; Visible safety bicycle handlebar right. 113.
114; Visible safety bicycle handlebar left. 114.
115: Visible safety bicycle seat post. 115.
116; Visible safety bicycle wheel spoke. 116.
117; Visible safety bicycle wheel rear hub. 117.
118; Visible safety bicycle wheel front hub. 118.
200; Front bicycle wheel. 200.
300; Rear bicycle wheel. 300.

What is claimed is:

1. A visible safety bicycle, comprising: a bicycle frame, comprising a bicycle handlebar, a bicycle seat post, a bicycle fork, a bicycle wheel hub, and at least one bicycle wheel spoke; and a plurality of photo-luminescent plastic spirals disposed on at least a portion of the bicycle frame, each of the plurality of photo-luminescent plastic spirals comprising: a visible day section disposed on an external side of each of the plurality of photo-luminescent plastic spirals along a length thereof to be visible during day, and a visible night section disposed on the visible day section along a length of the visible day section to be visible during night, such that the visible day section and the visible night section are separated by one of a groove or a recess at a center thereof on the external side.

2. The visible safety bicycle of claim 1, wherein the plurality of photo-luminescent plastic spirals, can be manufactured in materials such as plastics, polyethylene, and nylon.

3. The visible safety bicycle of claim 1, wherein the plurality of photo-luminescent plastic spirals, can be manufactured in one or more colors.

4. The visible safety bicycle of claim 1, wherein the plurality of photo-luminescent plastic spirals, can be manufactured in different diameters without limitations.

5. The visible safety bicycle of claim 1, wherein the plurality of photo-luminescent plastic spirals, can be manufactured in a constant diameter in its length.

6. The visible safety bicycle of claim 1, wherein the plurality of photo-luminescent plastic spirals, can be manufactured in variable diameter of its length.

7. The visible safety bicycle of claim 1, wherein the plurality of photo-luminescent plastic spirals, can be manufactured which is rolled from the right.

8. The visible safety bicycle of claim 1, wherein the plurality of photo-luminescent plastic spirals, can be manufactured which is rolled from the left.

9. The visible safety bicycle of claim 1, wherein the plurality of photo-luminescent plastic spirals, can be manufactured to suit round, square, triangular configurations and not limited to these configurations.

10. The visible safety bicycle of claim 1, wherein the plurality of photo-luminescent plastic spirals, can be manufactured where the color is the same both day and night.

11. The visible safety bicycle of claim 1, wherein the plurality of photo-luminescent plastic spirals, can be manufactured where the day color changes to another color at night.

12. The visible safety bicycle of claim 1, wherein the plurality of photo-luminescent plastic spirals, can be manufactured in two or more colors simultaneously.

13. The visible safety bicycle of claim 1, wherein the plurality of photo-luminescent plastic spirals, can be manufactured where the configuration in a cross section has a quadrangular, triangular, semi-round shape and is not limited thereto.

14. The visible safety bicycle of claim 1, wherein the plurality of photo-luminescent plastic spirals, can be manufactured where the spiral has perforated designs.

15. The visible safety bicycle of claim 1, wherein the plurality of photo-luminescent plastic spirals, can be manufactured in layers of different colors, having perforations with designs in one of them.

16. The visible safety bicycle of claim 1, wherein the plurality of photo-luminescent plastic spirals, can be manufactured with a self-adhesive on its inner side in its entirety or the ends.

17. The visible safety bicycle of claim 1, wherein the plurality of photo-luminescent plastic spirals, can be manufactured in different widths of the tape.

18. The visible safety bicycle of claim 1, wherein the plurality of photo-luminescent plastic spirals, can be manufactured with different angles and different spaces.

19. The visible safety bicycle of claim 1, wherein the plurality of photo-luminescent plastic spirals, can be manufactured in different thicknesses.

* * * * *